United States Patent
Lettow et al.

(10) Patent No.: US 11,614,146 B2
(45) Date of Patent: Mar. 28, 2023

(54) PLAY-FREE PLANETARY GEAR TRANSMISSION

(71) Applicant: KNORR-BREMSE Systeme fuer Nutzfahrzeuge GmbH, Munich (DE)

(72) Inventors: Dirk Lettow, Wuppertal (DE); Sven Kirschbaum, Mettmann (DE); Jens-Hauke Mueller, Velbert-Neviges (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/597,117

(22) PCT Filed: May 8, 2020

(86) PCT No.: PCT/EP2020/062885
§ 371 (c)(1),
(2) Date: Dec. 27, 2021

(87) PCT Pub. No.: WO2020/259906
PCT Pub. Date: Dec. 30, 2020

(65) Prior Publication Data
US 2022/0268339 A1 Aug. 25, 2022

(30) Foreign Application Priority Data
Jun. 26, 2019 (DE) ...................... 10 2019 117 227.6

(51) Int. Cl.
*F16H 1/28* (2006.01)
*F16H 57/08* (2006.01)
(52) U.S. Cl.
CPC ......... *F16H 1/2863* (2013.01); *F16H 57/082* (2013.01)
(58) Field of Classification Search
CPC ......... F16H 1/2863; F16H 57/082; F16H 1/48
See application file for complete search history.

(56) References Cited

U.S. PATENT DOCUMENTS

2007/0093354 A1* 4/2007 Berger .................. F16H 57/082
475/346
2008/0182708 A1 7/2008 Kato
(Continued)

FOREIGN PATENT DOCUMENTS

DE 102017009861 A1 * 5/2018
EP 2 735 767 A1 5/2014
(Continued)

OTHER PUBLICATIONS

International Preliminary Report on Patentability (PCT/IPEA/409) issued in PCT Application No. PCT/EP2020/062885 dated Sep. 28, 2021 with English translation (15 pages).
(Continued)

*Primary Examiner* — Justin Holmes
(74) *Attorney, Agent, or Firm* — Crowell & Moring LLP

(57) ABSTRACT

A planetary gear transmission has a sun gear, a ring gear, at least one first planet gear, and at least one second planet gear. The first planet gear and the second planet gear are arranged on a planet carrier, and the sun gear, the ring gear, the first planet gear, and the second planet gear mesh with one another. The planetary gear transmission is characterized in that the planet carrier has a first planet carrier part and a second planet carrier part. The first planet carrier part and the second planet carrier part are designed such that the planet carrier parts are rotated relative to each other starting from a base position and can be fixed in their respective rotated position relative to each other, wherein the at least one first planet gear is connected to the first planet carrier part, and the at least one second planet gear is connected to the second planet carrier part.

6 Claims, 5 Drawing Sheets

(56) References Cited

U.S. PATENT DOCUMENTS

2014/0148301 A1      5/2014   Westholt et al.
2016/0348759 A1*   12/2016   McCloy ................ F16H 1/2863

FOREIGN PATENT DOCUMENTS

| JP | 3-48045 A | 3/1991 |
| JP | 7-32248 A | 2/1995 |
| JP | 7-32248 U | 6/1995 |
| JP | 9-144818 A | 6/1997 |
| KR | 20140145340 A * | 12/2014 |

OTHER PUBLICATIONS

International Search Report (PCT/ISA/210) issued in PCT Application No. PCT/EP2020/062885 dated Jul. 1, 2020 with English translation (four (4) pages).
German-language Written Opinion (PCT/ISA/237) issued in PCT Application No. PCT/EP2020/062885 dated Jul. 1, 2020 (eight (8) pages).

* cited by examiner

Section A-A

Section B-B

Section C-C

Section D-D

PLAY-FREE PLANETARY GEAR TRANSMISSION

BACKGROUND AND SUMMARY OF THE INVENTION

The invention relates to a planetary gear transmission having a sun gear, a ring gear, and at least one first planet gear or at least one second planet gear, wherein the first planet gear and the second planet gear are arranged on a planet gear carrier and the sun gear, the ring gear, the first planet gear, and the second planet gear mesh with one another.

In transmission technology, in particular in the context of planetary gear transmissions (also called planetary transmissions), it is desirable to be able to set or, in particular, minimize the play of the flanks of the teeth of the mutually engaging or meshing gear wheels. A wide variety of measures are already known from the prior art to obtain a planetary gear transmission with as little play as possible. In this respect, it is possible to speak of a planetary gear transmission which is play-free or free of circumferential backlash.

A planetary gear transmission is, for example, already known from EP 2 735 767 A1. The planetary gear transmission according to EP 2 735 767 A1 has a sun gear and a ring gear, as well as a plurality of planet gears, wherein in each case a group of planet gears is arranged on an independent planet carrier and is connected thereto. For the purpose of minimizing the backlash, the two separate planet carriers provided as distinct components are connected to each other again by elastic spring elements. As a result, when the planetary gear transmission is assembled, the planet gears associated with one planet carrier can first be brought to bear against one side of the tooth flanks of the sun gear and ring gear in a direction of rotation. The other planet carrier, together with the planet gears associated therewith, can then be rotated counter to the resistance of the connecting spring elements. Lastly, these rotated planet gears can then be brought to bear against the other sides of the tooth flanks of the sun gear and ring gear in the opposite direction of rotation, as a result of which the backlash is ultimately minimized.

However, a disadvantage of the planetary gear transmission known from EP 2 735 767 A1 is that the measures described for minimizing the backlash are possible only in the case of planetary gear transmissions having two sets of planet gears and two planet carriers provided separately from each other. The two sets of planet gears namely have to be provided at different axial positions so that the axially spaced apart planet gears of the two sets of planet gears can be rotated relative to each other and can be aligned respectively on the ring gear and sun gear. Such a planetary transmission accordingly has a relatively high degree of complexity. For assembly, one set of planet gears must first be aligned and brought into engagement with the sun gear and the ring gear and then, after rotating the other set of planet gears, this other set of planet gears must then be aligned again and brought into engagement with the sun gear and the ring gear. The complexity of assembly or the complexity in setting the backlash is also accordingly relatively high. In addition, the planet gears of the second set of planet gears must be rotated counter to the restoring force of the spring elements during assembly and secured in this position by being brought into engagement with the sun gear and the ring gear. There is a risk here that the planet gears fall back into their non-adjusted position before being brought into engagement and there is hence a relatively large amount of backlash. There is moreover an opposite risk that the second set of planet gears is rotated too much, as a result of which too great a pretensioning of the two sets of planet gears relative to each other can result.

The object of the present invention is to provide a planetary gear transmission which enables the backlash between planet gears, the sun gear, and the ring gear to be settable with a low degree of complexity. It is intended that the construction be as simple as possible.

According to the invention, the object is achieved by a planetary gear transmission having the features of the independent claim.

In detail, the planetary gear transmission according to the invention is characterized in that the planet carrier has a first planet carrier part and a second planet carrier part, wherein the first planet carrier part and the second planet carrier part are configured in such a way that, starting from a basic position, they are rotated relative to each other and can be secured in their situation relative to each other in a rotated position, and in that the at least one planet gear is connected to the first planet carrier part, and the at least one second planet gear is connected to the second planet carrier part.

An essential part of the present invention is the insight that if the planet carrier is designed in two parts with the at least two planet gears, the two parts of the planet carrier can be rotated relative to each other. Because one or alternatively a plurality of planet gears are here furthermore associated with a respective part of the planet carrier and the other planet gear or the other planet gears are associated with the other part of the planet carrier, the situation of the planet gears relative to one another can also be modified by rotating the planet carrier parts. The planet gears can thus be displaced in contrary directions relative to one another along their orbits or their trajectories by rotating the planet carrier parts, whilst the sun gear and the ring gear remain stationary. In this way, the respective planet gears can be brought to bear against the tooth flanks of the ring gear or sun gear, viewed in different directions of rotation.

Rotating the two planet carrier parts relative to each other is understood to mean a rotation about the axis of the planet carrier. A movement of the planet gear or the respective planet gears associated with the respective planet carrier part therefore results from such rotation. This also corresponds to a movement of the respective planet gear or planet gears, along the orbit or trajectory of which the planet gears travel whilst they mesh with the sun gear and the ring gear. The movement of a planet gear on its orbit or trajectory is therefore coupled with the movement of a planet carrier part associated with this planet gear in such a way that the planet gear follows a rotation of the planet gear part.

In the present case, a first planet carrier part and a second planet carrier part are understood to mean that, although they can be separate components, the two planet carrier parts can together form a planet carrier. At least one planet gear is thus associated with each planet carrier part, i.e. it is connected thereto such that, in an assembled state, the planet carrier formed from the first planet carrier part and from the second planet carrier part has at least two planet gears in one stage, said two planet gears meshing on a trajectory along the sun gear and the ring gear. In the present case, the first planet carrier part and the second planet carrier part are understood not to mean two distinct, separate planet carriers which each have different sets of planet gears, said sets of planet gears each in their own right meshing on a trajectory along the sun gear and the ring gear. It is accordingly possible by virtue of the present invention to set the play of tooth flanks of planet gears, said planet gears meshing with the sun gear and ring gear along the same trajectory.

By virtue of the planetary gear transmission according to the invention, it is accordingly possible to adjust the position of the first planet gear and the second planet gear relative to each other. More than just one planet gear can also be provided here. Thus, for example, two planet gears situated opposite each other, viewed on the orbit or trajectory, can be provided, as well as two further planet gears likewise situated opposite each other, viewed on the orbit or trajectory. In this respect, within the sense of the present invention it is then possible to speak of two first planet gears and two second planet gears. The two first planet gears can then, for example, be rotated jointly with the first planet carrier part to which they are connected and hence their position on their orbit or trajectory can be modified jointly, whilst the two second planet gears, for example with the second planet carrier part associated with them and to which they are connected, remain in their position. Any desired number of planet gears can also be provided. The only essential thing is that different planet gears can be adjusted relative to each other in terms of their position on their orbit or trajectory by the two planet carrier parts being rotated relative to each other.

Moreover, the planetary gear transmission according to the invention can be a single-stage planetary gear transmission or alternatively be a multi-stage planetary gear transmission.

According to a first advantageous development of the planetary gear transmission, the first planet carrier part can be formed by two externally situated disks and the second planet carrier part can be arranged essentially between the two externally situated disks. An embodiment which is particularly economical in terms of structural space is obtained as a result. In the present case, externally situated disks are understood to mean that the two disks are arranged on opposite sides of the planet gears. In other words, the planet gears are arranged between the two disks, viewed in the direction of the axes of the planet gears. In the present case, the wording "arranged essentially between the two externally situated disks" is understood to mean that the second planet carrier part arranged in this way does not need to extend over the whole distance between the two externally situated disks but that the majority of this second planet carrier part is arranged there.

According to an advantageous embodiment of the planetary gear transmission, the second planet carrier part can be arranged between the two externally situated disks of the first planet carrier part in such a way that the first planet carrier part and the second planet carrier part are fixed in their situation relative to each other by a retaining force acting from the two externally situated disks in the direction of the second planet carrier part. In the installed state of the planetary gear transmission, when the planetary gear transmission is in operation, the retaining force can thus be exerted by the two externally situated disks on the second planet carrier part arranged in between them, for example by the connecting means connecting the two disks. Further ability of the two planet carrier parts to rotate relative to each other can be obtained, for example, by the connecting means being released. When the retaining force pressing or holding the two disks together is relaxed again, the first planet carrier part and the second planet carrier part can be rotated relative to each other. The fundamentally possible ability of the two planet carrier parts to rotate relative to each other can therefore be prevented in the installed or operating state by the retaining force being maintained by the externally situated disks. In contrast, relaxing the retaining force or the compressive force resulting therefrom results in the restoration of the fundamental ability of the two planet carrier parts to rotate.

According to an advantageous embodiment of the planetary gear transmission, the two externally situated disks of the first planet carrier part can be connected to each other by means of a spindle of the at least one first planet gear. In the case of a plurality of first planet gears, the disks can also be connected to each other by means of the spindles of all the first planet gears. A structurally simple embodiment is obtained as a result because only a small number of further components are required to connect the two disks.

According to an advantageous embodiment of the planetary gear transmission, the two externally situated disks of the first planet carrier part can be connected to each other by means of at least one setting screw which can here in particular be a hexagon socket screw. A plurality of setting screws can also be provided for the purpose of connecting the two disks. The setting screw or setting screws can preferably be arranged at a distance from the spindles of the planet gears, particularly preferably uniformly distributed over the circumference in relation to the spindles of the planet gears. The setting screws can be arranged in such a way that a screw head of the setting screw protrudes from the outside of one of the two externally situated disks, wherein, at a different end of the setting screw, a thread of the setting screw engages in the other of the two externally situated disks. Locking the setting screw or setting screws can then ensure that the position of the first planet carrier part and the second planet carrier part relative to each other is secured or fixed, whilst loosening the setting screw or setting screws makes possible the ability of the two planet carrier parts to rotate and hence enables the planet gears to be adjusted relative to one another and the backlash to be set.

According to an advantageous embodiment of the planetary gear transmission, the at least one setting screw which connects the two externally situated disks of the first planet carrier part to each other can extend through at least one bore of the second planet carrier part, wherein the at least one bore of the second planet carrier part is designed to be greater than the diameter of the setting screw in such a way that, when the at least one setting screw is loosened, rotation of the first planet carrier part relative to the second planet carrier part is possible, even whilst the setting screw extends through the at least one bore of the second planet carrier part. This also applies when a plurality of setting screws and a plurality of bores for these setting screws are provided in the second planet carrier part. The ability of the planet gears to rotate relative to each other in the already installed state of the planetary gear transmission is consequently ensured in an easily manageable fashion. Thus, when the ring gear, sun gear, and planet gears which are installed on the planet carrier are already meshed with one another, the setting screw or setting screws can be loosened easily. As a result, the externally situated first planet carrier part can then be rotated together with the planet gears connected thereto and the setting screw or screws which moreover connects or connect the two externally situated disks of the first planet carrier part. This rotation is possible because of the play which is provided by the larger bore or bores in the second planet carrier part compared with the setting screw extending through the respective bore. In a preferred exemplary embodiment, the provided setting screw can, for example, be an M5×24 screw, whilst the bore in the second planet carrier part then has a diameter of 6 mm and hence affords sufficient range of movement at least for a certain displacement of the setting screw inside the bore of the second planet carrier part. In particular, a plurality of bores can be provided in the second planet carrier part. Thus, the second planet carrier part can be formed, for example, from two opposite disks, wherein the planet gears are arranged between the two disks. A respective bore can then be provided in each of the two disks of the second planet carrier part for each setting screw. The second planet carrier part can then therefore have two bores per setting screw.

The invention is explained in detail with the aid of the following drawings. The drawings are to here be understood only as examples and in particular they only represent a preferred exemplary embodiment of the invention.

DETAILED DESCRIPTION OF THE DRAWINGS

Figure 1:
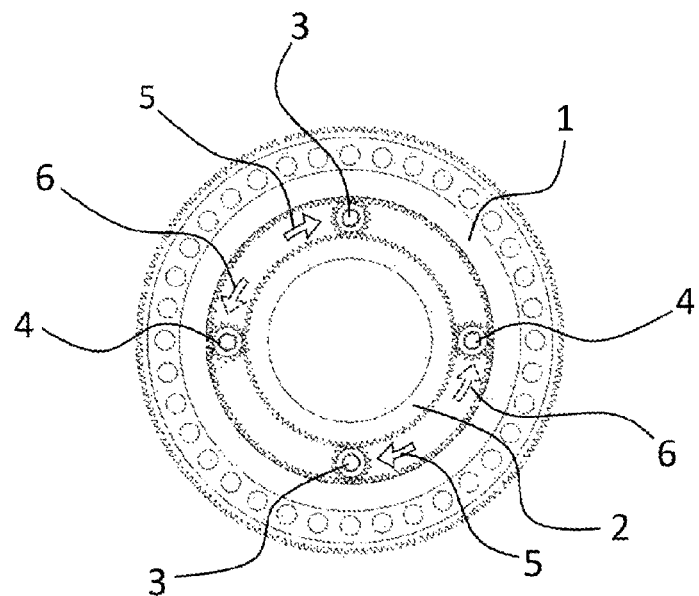
FIG. 1 shows a planetary gear transmission according to an embodiment of the invention in a schematic front view with the planet carrier not reproduced.

A planetary gear transmission is illustrated in FIG. 1. The planetary gear transmission comprises a ring gear 1 and a central sun gear 2. Meshing or engaging with the ring gear 1 and with the sun gear 2, a total of four planet gears, namely two first planet gears 3 and two further planet gears 4, are moreover provided. The two first planet gears 3 are arranged opposite each other with respect to their trajectory, as are the two second planet gears 4.

The first planet gears 3 and the second planet gears 4 are connected to a planet carrier (not illustrated in FIG. 1). This planet carrier in turn is designed in two parts, as is clear from the following description in conjunction with the further illustrations.

Essential to the present invention is the recognition that the planet gears associated with the respective planet carrier part are also adjusted via a relative adjustment of the two planet carrier parts, and in this way the backlash between the first planet gears 3, the second planet gears 4, the sun gear 2, and the ring gear 1 can be adjusted or minimized. The two first planet gears 3 can thus be displaced jointly along their trajectory via a rotation of the planet carrier part associated therewith, as indicated by the solid arrow 5 in FIG. 1. Rotation or displacement in the opposite direction counter to the solid arrow 5 is also possible. Likewise, the two second planet gears 4 can be displaced jointly along their trajectory via a rotation of the planet carrier part associated therewith, as indicated by the dashed arrow 6 in FIG. 1. Rotation or displacement in the opposite direction counter to the dashed arrow 6 is also possible.

The tooth flanks of these planet gears can be brought to bear against those of the ring gear 1 or the sun gear 2 by a described displacement or rotation of the first planet gears 3 and/or the second planet gears 4, as a result of which play can be minimized and a play-free planetary gear transmission can be obtained.

Figure 2:
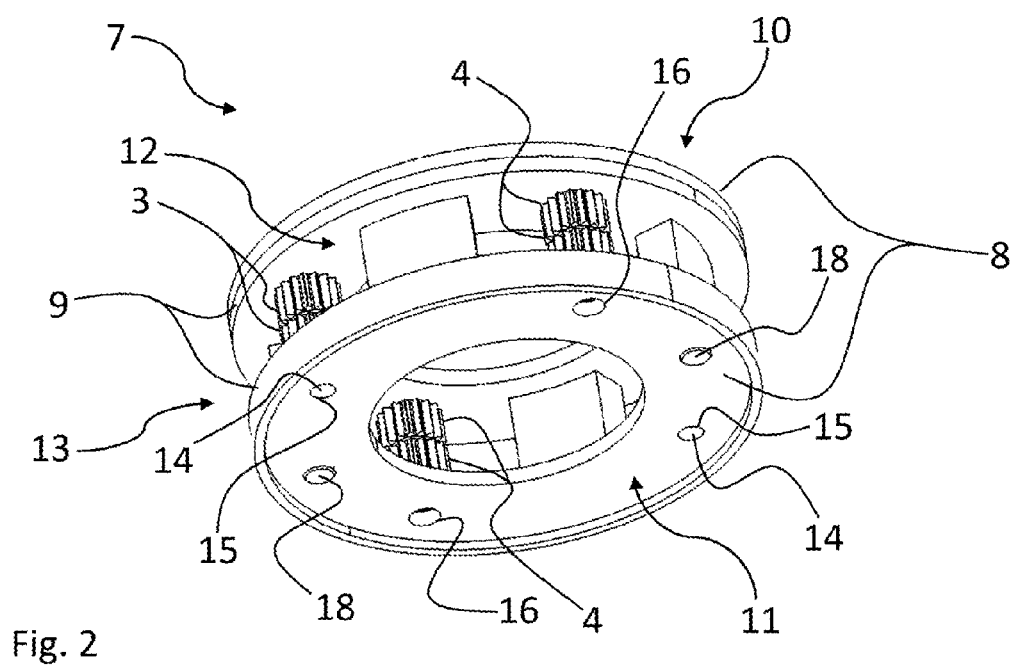
FIG. 2 shows the planet carrier of the planetary gear transmission according to an embodiment of the invention in a perspective view with the ring gear and the sun gear of the planetary gear transmission not reproduced.
Figure 3:
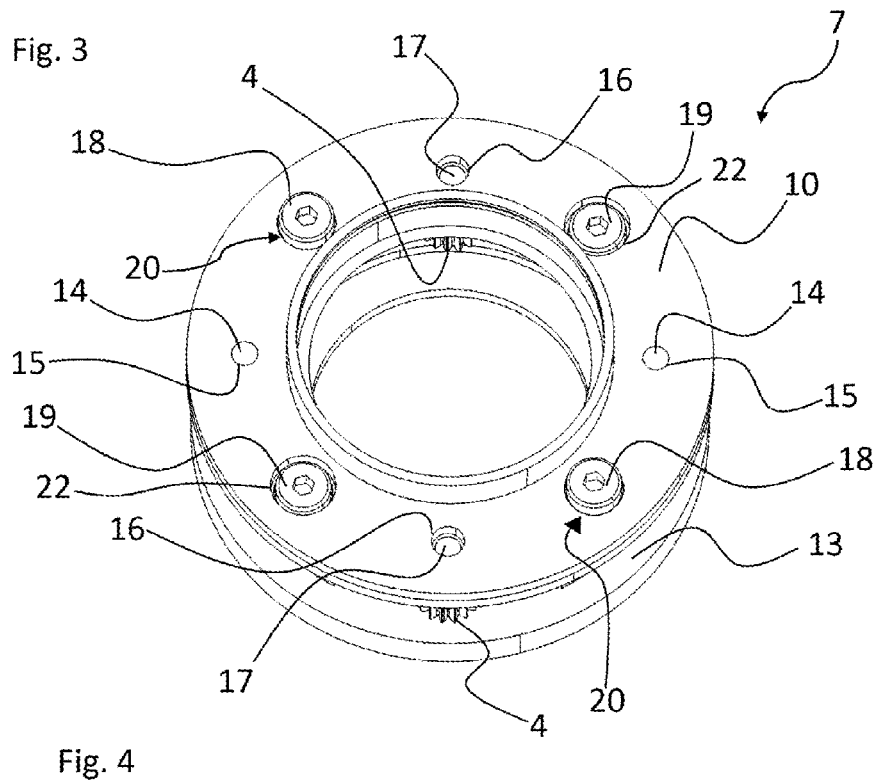
FIG. 3 shows the planet carrier according to FIG. 3 in a further perspective view from an opposite side.

In FIG. 2 and FIG. 3, the planet carrier 7 of the planetary gear transmission is illustrated in perspective views. The planet carrier 7 has a first planet carrier part 8 and a second planet carrier part 9. The first planet carrier part 8 is here formed by two externally situated disks 10 and 11 and the second planet carrier part 9 is arranged essentially between the two externally situated disks 10, 11. In the present case, the second planet carrier part 9 is also formed by two externally situated disks 12 and 13, as can be seen in particular from jointly consulting FIG. 3.

In the present case, the essential thing is that the first planet gears 3 are connected to the first planet carrier part 8 and the second planet gears 4 are connected to the second planet carrier part 9. This means that the position of the first planet gears 3 with respect to their situation on their trajectory is fixedly linked to the situation of the first planet carrier part 8, whilst the situation of the second planet gears 4 corresponds to the situation of the second planet carrier part 9. It can be observed that the spindles 14 of the first planet gears 3 extend as far as the two externally situated disks 10, 11 of the first planet carrier part 8. The spindles 14 are mounted in bores 15 of the two disks 10, 11 such that rotation of the disks 10, 11 or the first planet carrier part 8 also results in a movement of the first planet gears 3 along their trajectory. In contrast, the second planet gears 4 have spindles 17 (visible in FIG. 3 but not in FIG. 2) which do not extend into the externally situated disks 10, 11 of the first planet carrier part 8. This can be seen with reference to the bores 16 in the disks 10, 11 in which none of the spindles 17 of the second planet gears 4 are mounted. Accordingly, the situation of the second planet gears 4 is independent of the situation of the first planet carrier part 8.

In fact, the situation of the second planet gears 4 is coupled with the situation of the second planet carrier part 9. As illustrated with the aid of FIG. 3, although the spindles 17 of the second planet gears 4 do not extend into the bores 16 of the disk 10 (and neither into bores 16 of the disk 11, as can be seen in FIG. 2), the spindles 17 are mounted in the disks 12 and 13 of the second planet carrier part 9. In this way, when the first planet carrier part 8 rotates whilst the second planet carrier part 9 remains stationary, the first planet gears 3 and the second planet gears 4 are moved relative to each other on their trajectories. The play of the flanks can thus be set and minimized.

The first planet carrier part 8 and the second planet carrier part 9 are configured in such a way that, starting from a basic position, they are rotated relative to each other and can be secured in their situation relative to each other in a rotated position.

For this purpose, as already described above, the two externally situated disks 10, 11 of the first planet carrier part 8 are connected to each other by means of the spindles 14 of the first planet gears 3. Moreover, the two externally situated disks 10, 11 of the first planet carrier part 8 are, in the exemplary embodiment illustrated and in this respect preferred in the present case, connected to each other by means of two setting screws 18 designed as hexagon socket screws.

The setting screws 18 are arranged opposite each other with respect to the circumference of the disks 10, 11. Moreover, they are arranged centrally between two neighboring spindles 14 of the first planet gears and spindles 17 of the second planet gears 4. However, in the exemplary embodiment illustrated and in this respect preferred, setting screws 18 are not provided between all the neighboring spindles 14 and 17 of the first and second planet gears 3 and 4. Instead, simple connecting screws 19, likewise designed as hexagon socket screws, of the second planet carrier part 9 are moreover provided. These connecting screws 19 serve only to connect the two disks 12 and 13 of the second planet carrier part 9 to each other and hence to form the second planet carrier part 9. The setting screws 18 and the connecting screws 19, as well as the spindles 14 and 17 of the first and second planet gears 3 and 4, are arranged distributed uniformly over the circumference of the disks 10, 11, 12, 13.

The setting screws 18 are moreover arranged in such a way that a screw head 20 of the setting screws 18 protrudes from the outside of a disk 10 of the two externally situated disks 10, 11, whilst, at the other end of the setting screws 18, a thread of the setting screws 18 engages in the other disk 11 of the two externally situated disks 10, 11, as is illustrated by the combined views in FIG. 2 and FIG. 3. Locking the setting screws 18 thus results in the position of the first planet carrier part 8 and the second planet carrier part 9 relative to each other being fixed, whilst loosening the setting screws 18 makes possible the ability of the two planet carrier parts 8, 9 to rotate and hence enables the first planet gears 3 and the second planet gears 4 to be adjusted relative to one another and the backlash to be set.

In order to set or minimize the backlash, in detail the following procedure can be followed after a planetary gear transmission has been assembled: first, the setting screws 18, which are easily accessible from the top side of the disk 10 as hexagon socket screws, can be loosened; then, the first planet carrier part 8, together with the first planet gears 3 connected thereto, can be rotated such that the first planet gears 3 move along their trajectory relative to the second planet gears 4 which remain stationary and the second planet carrier part 9; lastly, the setting screws 18 can be tightened again and in this way the situation of the first planet carrier part 8 and the second planet carrier part 9 relative to each other and the positions of the first planet gears 3 and the second planet gears 4 are secured or fixed.

The second planet carrier part 9 is here arranged between the two externally situated disks 10, 11 of the first planet carrier part 8 in such a way that the first planet carrier part 8 and the second planet carrier part 9 are fixed in their situation relative to each other by a retaining force acting from the two externally situated disks 10, 11 in the direction of the second planet carrier part 9. The two disks 10, 11 are here held together and the retaining force is exerted on them by the setting screws 18 being tightened. As soon as the setting screws 18 are loosened again, the first planet carrier part 8 and the second planet carrier part 9 can be rotated relative to each other again.

In contrast to the screw heads of the setting screws 20, the screw heads of the connecting screws 19 do not project from the outside of the disk 10 of the first planet carrier part 8. In this way, the setting screws 18 can be distinguished from the connecting screws 19 at first glance from outside such that it is possible to effectively avoid inadvertent loosening of the connecting screws 19 in the case of an intended setting of the backlash.

Figure 4:
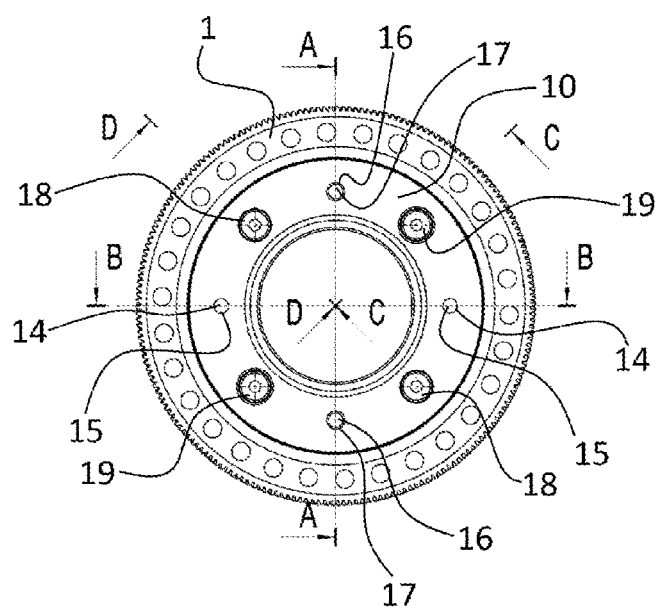
FIG. 4 shows a planetary gear transmission according to an embodiment of the invention in a front view.
Figure 4A:
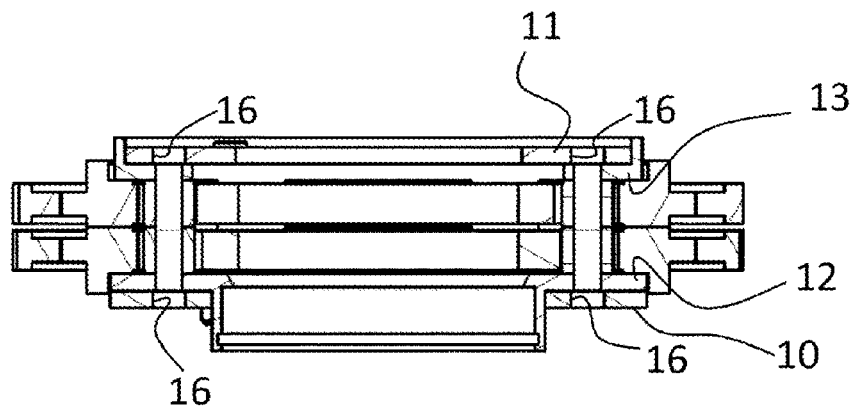
FIG. 4A shows the planetary gear transmission in a view in section according to the line of section A-A in FIG. 4.
Figure 4B:
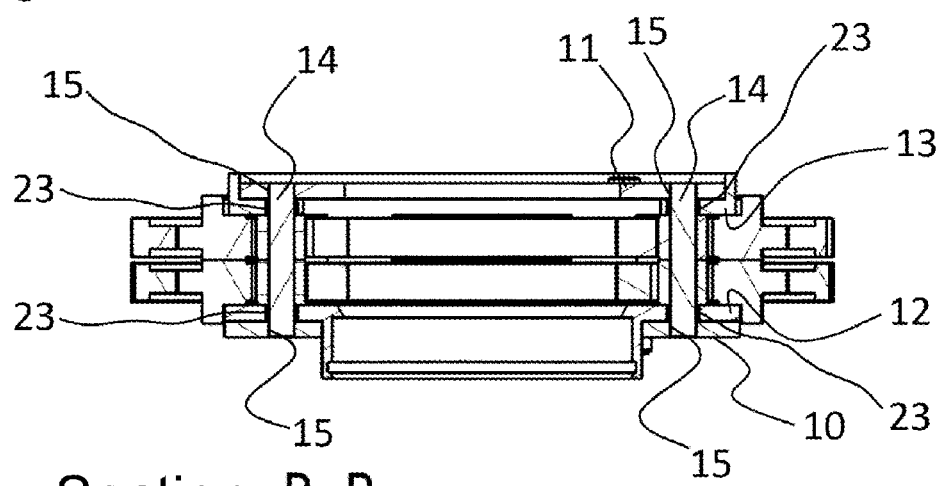
FIG. 4B shows the planetary gear transmission in a view in section according to the line of section B-B in FIG. 4.
Figure 4C:
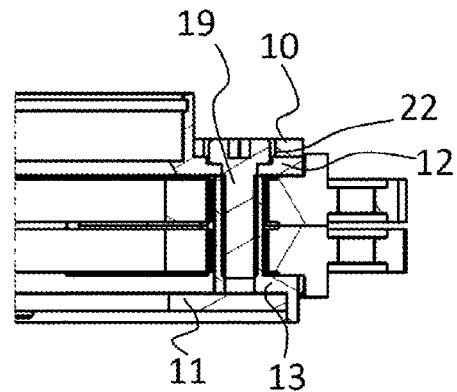
FIG. 4C shows the planetary gear transmission in a view in section according to the line of section C-C in FIG. 4.
Figure 4D:
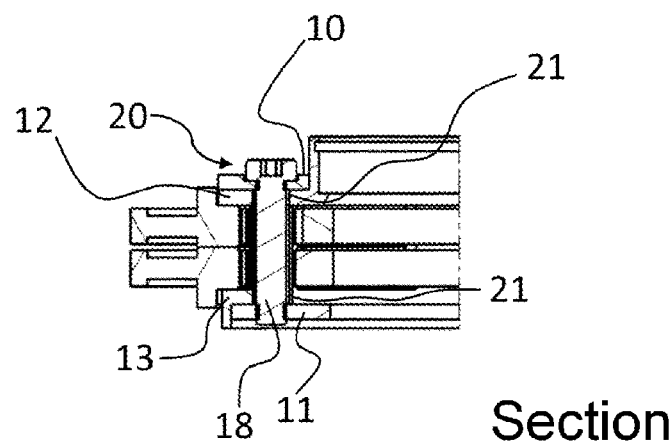
FIG. 4D shows the planetary gear transmission in a view in section according to the line of section D-D in FIG. 4.
Figure 5:
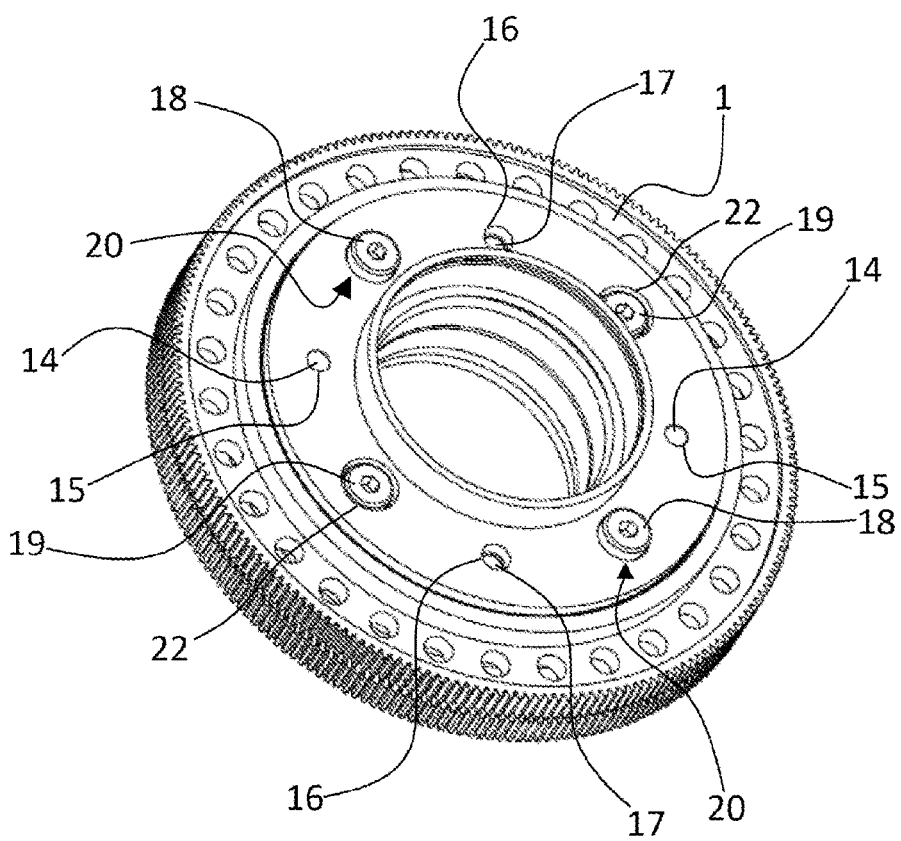
FIG. 5 shows a planetary gear transmission in a perspective view.

The further details of the present invention and advantageous embodiments are illustrated with the aid of the illustration in FIG. 4 and the corresponding views in section in FIGS. 4A, 4B, 4C, and 4D, and with the aid of the perspective view in FIG. 5, wherein the same reference numerals refer to the same features. In this respect, the descriptions given above also apply for the said further illustrations and there is no need to repeat the explanation.

By jointly consulting FIG. 4 and FIG. 4D, it can in particular be seen that the setting screws 18, which connect the two externally situated disks 10 and 11 of the first planet carrier part 8 to each other, extend through a respective bore 21 of the second planet carrier part 9. The bore 21 of the second planet carrier part 9 is here designed to be larger than the diameter of the setting screws 18 in such a way that, when the setting screws 18 are loosened, rotation of the first planet carrier part 8 relative to the second planet carrier part 9 is possible even whilst the setting screw 18 still extends through the respective bore 21 of the second planet carrier part 9. The bores 21 in the second planet carrier part 9 are provided in the respective disks 12 and 13. Because these bores 21 are designed to be larger than the diameter of the setting screws 18, a range of movement is provided within which the first planet carrier part 8 can be rotated counter to the second carrier part 9 and the first planet gears 3 can thus be displaced relative to the second planet gears 4. This ability to rotate and the ability, resulting therefrom, of the backlash to be set are possible when the setting screws 18 are loosened. However, the setting screws 18 must here be loosened only to such an extent that the two disks 10 and 11 of the first planet carrier part 8 are no longer pressed against each other as strongly as was required beforehand in order to prevent relative movement of the two planet carrier parts 8 and 9 relative to each other. In other words, the retaining force which is exerted by the two disks 10 and 11 on the second planet carrier part 9 must be relaxed in order to enable the two planet carrier parts 8 and 9 to rotate relative to each other. Conversely, the position of the two planet carrier parts 8 and 9 can then be fixed again by the setting screws being retightened and the disks 10 and 11 of the first planet carrier part 8 being pressed against the disks 12 and 13, situated further inward, of the second planet carrier part 9 such that a relative movement of the planet carrier parts 8, 9 relative to each other is again effectively prevented.

In the exemplary embodiment which is illustrated and in this respect is preferred in the present case, the setting screws 18 can, for example, be M5×24 screws. The bores 21 in the disks 12 and 13 can then be bores with a diameter of 6 mm such that, when the setting screws 18 are loosened, a certain ability of the two planet carrier parts 8, 9 to rotate relative to each other is ensured, even when the setting screws 18 extend through the bores 21 and hence through the disks 12 and 13 of the second planet carrier part 9.

As is additionally illustrated in FIG. 4C, the ability of the two planet carrier parts 8 and 9 to rotate is moreover ensured, in the exemplary embodiment which is illustrated and in this respect is preferred, by the disk 10 having a bore 22 which has a larger diameter than the screw head of the connecting screws 19. Specifically, in the exemplary embodiment M5×16 screws, which have screw heads with a diameter of 8.5 mm, can be provided as the connecting screws 19, whilst the bore 22 in the disk 10 has a diameter of 10 mm and thus provides some clearance for relative movement of the second planet carrier part 9 with the disks 12 and 13 and the connecting screws 19 relative to the first planet carrier part 8.

As is furthermore illustrated in FIG. 4B, the ability of the two planet carrier parts 8 and 9 to rotate is moreover ensured, in the exemplary embodiment which is illustrated and in this respect is preferred, by the disks 12 and 13 each having bores 23 for the spindles 14 of the first planet gears 3, wherein the bores 23 have a larger diameter than the spindles 14. Specifically, in the exemplary embodiment spindles 14 can be provided which have a diameter of 4 mm. The spindles 17 of the second planet gears 4 also have a diameter of 4 mm. In contrast, the bores 23 in the disks 12 and 13 have a diameter of 5 mm such that clearance is ensured for relative movement of the first planet carrier part 8 with the disks 10 and 11 along with the first planet gears 3 and their spindles 14 relative to the second planet carrier part 9 with the disks 12 and 13 which have the bores 23 through which the spindles 14 extend.

What is claimed is:

1. A planetary gear transmission, comprising:
a sun gear;
a ring gear; and
at least one first planet gear or at least one second planet gear, wherein
the first planet gear and the second planet gear are arranged on a planet carrier,
the sun gear, the ring gear, the first planet gear, and the second planet gear mesh with one another,
the planet carrier has a first planet carrier part and a second planet carrier part,
the first planet carrier part and the second planet carrier part are configured such that, starting from a basic position, they are rotated relative to each other and are fixable in their respective rotated position relative to each other, and
the at least one planet gear is connected to the first planet carrier part, and the at least one second planet gear is connected to the second planet carrier part,
the first planet carrier part is formed by two externally situated disks and the second planet carrier part is arranged essentially between the two externally situated disks, and
the two externally situated disks of the first planet carrier part are connected to each other by at least one setting screw configured as a hexagon socket screw.

2. The planetary gear transmission as claimed in claim 1, wherein
the second planet carrier part is arranged between the two externally situated disks of the first planet carrier part such that the first planet carrier part and the second planet carrier part are fixed in their respective rotated position relative to each other by a retaining force acting from the two externally situated disks in the direction of the second planet carrier part.

3. The planetary gear transmission as claimed in claim 1, wherein
the two externally situated disks of the first planet carrier part are connected to each other via a spindle of the at least one first planet gear.

4. The planetary gear transmission as claimed in claim 1, wherein
the at least one setting screw which connects the two externally situated disks of the first planet carrier part to each other extends through at least one bore of the second planet carrier part,
the at least one bore of the second planet carrier part is designed to be greater than the diameter of the setting screw in such a way that, when the at least one setting screw is loosened, rotation of the first planet carrier part relative to the second planet carrier part is possible, even whilst the setting screw extends through the at least one bore of the second planet carrier part.

5. The planetary gear transmission as claimed in claim 1, wherein
the planetary gear transmission is a single-stage planetary gear transmission.

6. The planetary gear transmission as claimed in claim 1, wherein
the planetary gear transmission is a multi-stage planetary gear transmission.

* * * * *